Figure 3:
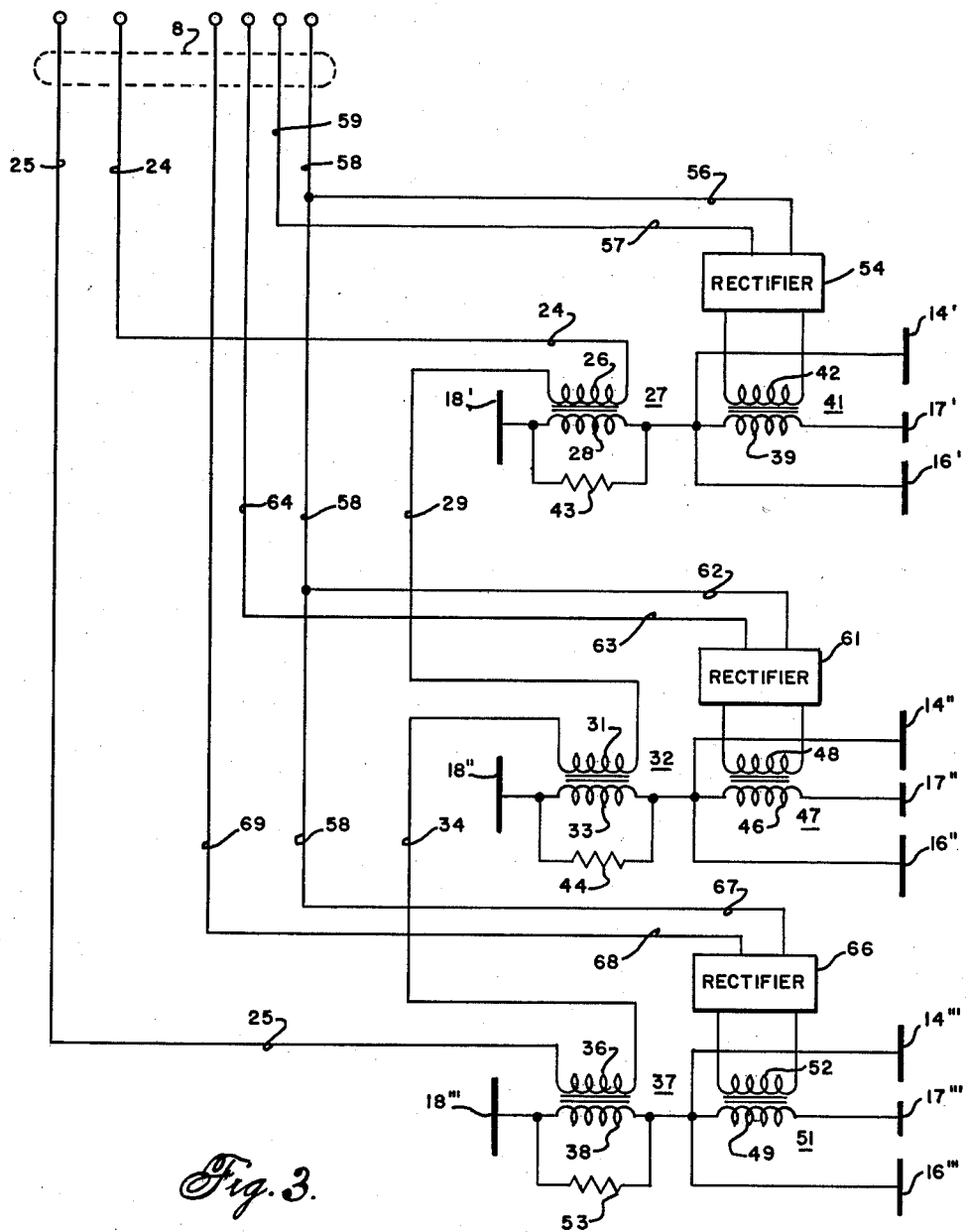

Sept. 24, 1963                J. R. SCHOPPER                3,105,191
            PLURAL FOCUSING ELECTRODE SYSTEMS FOR MEASURING
                    THE DIP OF SUBSURFACE STRATA
Filed Nov. 16, 1959                                    2 Sheets-Sheet 1
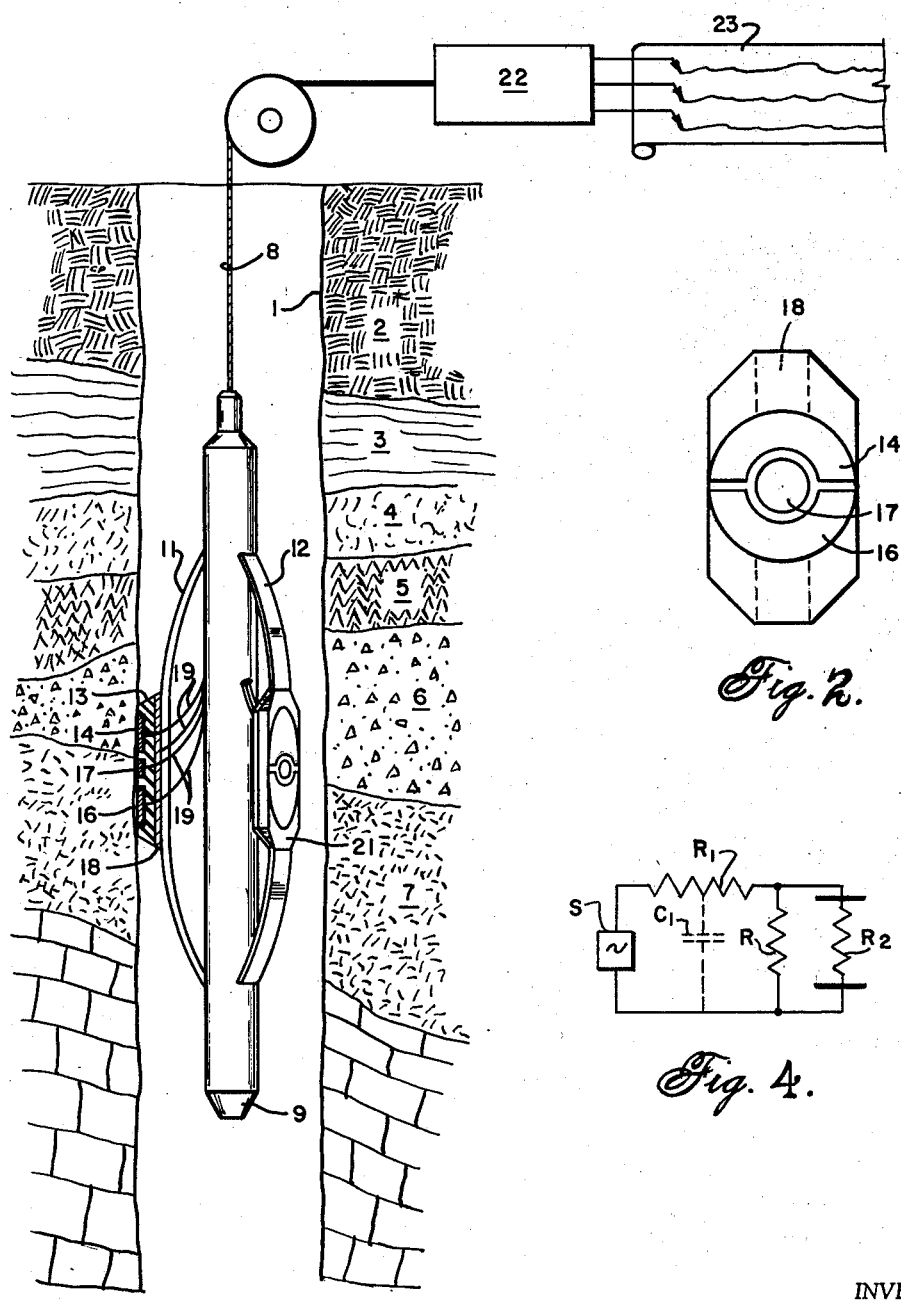
INVENTOR
JURGEN R. SCHOPPER
BY Robert K. Schumacher
                ATTORNEY

INVENTOR
JURGEN R. SCHOPPER

3,105,191
PLURAL FOCUSING ELECTRODE SYSTEMS FOR MEASURING THE DIP OF SUBSURFACE STRATA
Jurgen R. Schopper, Tulsa, Okla., assignor to Dresser Industries, Inc., Dallas, Tex., a corporation of Delaware
Filed Nov. 16, 1959, Ser. No. 853,272
5 Claims. (Cl. 324—10)

The present invention relates to well-logging equipment and, more particularly, to a well-logging apparatus for determining the dip of subsurface formations by recording three curves which are functions of the formation resistivities, the three curves being derived from resistivity measurements taken at locations displaced 120° from one another about the interior of the bore hole wall.

Resistivity measurements of subsurface formations have heretofore been derived by passing a current between each of three electrodes spaced apart 120° about the bore hole wall and a common electrode, and by measuring the voltage between the electrodes and the current therethrough. In order to locate accurately the interface between two formations, the area over which the current is injected into the formation at each of the three electrodes must be maintained quite small so that, upon passing over an interface between two formations, an abrupt change in resistivity may be detected. Also of importance to a precise determination of the interface between two formations is the angle of entry of the current into the formation. The resistivity measurement is a function not only of the resistivity of the formations under investigation but also of the mud cake on the bore hole wall. By insuring that the current from the electrode is directed perpendicular to the wall, the current passes through the least possible thickness of the mud cake so that the latter's effect is minimized.

In recent years there has been developed a focusing electrode system which employs a small central electrode and a plurality of focusing electrodes grouped symmetrically thereabout. The focusing electrodes help to confine the current emanating from the central electrode to a quite small cross sectional area and to insure that the current enters the formations at right angles thereto thereby to insure accurate delineation of the various formations encountered. In such a system, all of the electrodes including the center electrode and the focusing electrodes grouped about it must be maintained at the same potential so as to establish an electric potential distribution parallel to the faces of the electrodes. In this system, current emanates from all of the electrodes but only that current associated with the center electrode is of interest in determining the resistivity of the formation and must be measured. However, since the voltage on all of the electrodes must be of substantially the same magnitude, the impedance of the system for measuring the current in the center electrode must be quite small. Conventionally, the measuring circuit for the current through the center electrode comprises a transformer having a low impedance input winding connected in series with the center electrode only and having a secondary winding which provides for large voltage amplification; that is, the secondary winding has a considerably larger number of turns than the primary winding.

In order to measure resistivity, two distinct quantities must normally be measured, these being the current and a voltage. In consequence, a current and a voltage reading are returned to the surface for each of the three electrode systems employed and this requires that seven distinct leads be returned to the surface station, one each for the current and voltage measurements of each of the electrode systems and a common lead. In well logging cables, the number of leads available are limited by considerations of size and weight and since dip logging apparatus of the type described is normally employed in conjunction with numerous other measuring instruments, the utilization of six distinct circuits for the measurement of a single quantity imposes severe strain upon the information-handling capabilities of the over-all system. The number of factors to be measured may be reduced if one of the factors is held at a constant known value. If a constant voltage is applied to the focusing electrode circuit and the magnitude of this voltage is known, then it is only necessary to transmit to the surface, readings of the current flowing through the central electrode of each of the focusing electrode systems. However, a constant voltage cannot be applied to the circuit at the surface location since the capacitance and resistance of the instrument cable prevent a constant voltage from being maintained at the well tool. An alternative arrangement would be the application of a constant current to the instrument cable and subsequently to the electrode systems since, then, only the value of the voltage drop across the electrode systems would be required to be measured. However, it is not possible to determine how the current divides between the various electrodes of the focusing electrode system and since only the current to the center electrode of each of the systems is to be measured, such a system cannot be employed with any degree of accuracy.

In accordance with the present invention, there is provided a dip logging circuit employing a focusing electrode system in which only four leads are required to transmit to the surface, information necessary to a determination of the resistivity of the formation being measured, three leads carrying information signals for each of three focusing electrode systems and a fourth lead constituting a common lead. Specifically, a known substantially constant voltage is developed at the well logging tool and is applied to the focusing electrodes so that only the current reading must be returned to the surface station. However, instead of attempting to supply a constant voltage to the system at the surface station, which, as indicated above, would not appear as a constant voltage at the well tool since variations in cable length, leakage in the circuit and variations in impedance of the formations would change the voltage developed at the well logging tool, a constant current is supplied at the surface station and is passed through a known fixed value of resistance at the well logging tool. The application of a constant current to the well logging circuit at the surface station is not in itself sufficient to maintain a constant voltage at the well logging tool, since the circuit as seen at the surface station comprises the impedance of the cable and the fixed value resistor connected in series, with the variable resistance of the formation connected in parallel with the fixed value resistor. Since the resistance of the formation, which is connected in parallel with the fixed value resistor, varies the division of current between these two resistors varies with the variation in the former quantity and will, unless precautions are taken, produce intolerable variations of the voltage across the fixed resistor. However, by choosing the value of the fixed value resistor considerably smaller than the resistance of the formation, at least an order of magnitude smaller, the variation in current through the fixed resistor with variation in the resistivity of the formation is so slight that for all practical purposes the voltage across the fixed resistor is maintained sufficiently constant.

In order to isolate the well logging cable from the focusing electrode system, the constant current developed at the surface is coupled to the focusing electrode system by means of a transformer and to insure that the same current is applied to all of the fixed resistors of each of the focusing electrode systems, the primary windings of the transformers are connected in series. The secondary winding of each of the transformers is connected in series between the focusing electrodes of a respective electrode system and its associated current collector electrode, and the fixed value resistor is connected in parallel with the transformer secondary so that the substantially constant voltage described above is applied in series between a focusing electrode system and its respective current collector.

As previously indicated, the current flowing through the center electrode of each of the focusing electrodes systems is detected by a transformer having a very low impedance input winding and each of the secondaries of these transformers feeds a rectifier, which has one output terminal connected to a common return conductor and its other terminal connected to a distinct information conductor. The four conductors thus provided are returned to the surface and are connected through suitable amplifiers to a recorder.

Although the circuit of the present invention is described as being applicable to determining the dip of subsurface formations and therefore requires the utilization of three electrode systems, if it is desired to measure resistivity only, less than three electrode systems may be employed and it is not intended to limit the present invention to a specific number of electrode systems.

It is seen from the above that the apparatus of the present invention provides a focusing electrode dip logging system employing a minimum number of conductors for the return of information signals to a surface station while at the same time insuring accuracy of measurement by utilizing a substantially constant voltage across the focusing electrode system.

It is an object of the present invention to provide a dip logging circuit employing three focusing electrodes systems disposed at 120° locations about the interior wall of a bore hole in which a minimum number of information conductors are required for conveying the information relating to resistivity, as determined by each of the focusing electrode systems, to a surface station.

It is another object of the present invention to provide a dip logging circuit employing focusing electrode systems in which only information relating to the current supplied to a center electrode of the focusing electrode system must be returned to a surface station in order to provide complete information relating to the resistivity of the formations encountered by the system.

It is yet another object of the present invention to provide a dip logging circuit employing three focusing electrode systems in which a constant current is applied at the surface station and is subsequently converted to a constant voltage at a subsurface dip logging tool so that a known constant voltage is developed across each of the focusing electrode systems and therefore only readings relating to current must be returned to a surface station.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a vertical view partially in cross section of a well bore illustrating the utilization of the apparatus of the present invention;

FIGURE 2 of the accompanying drawings is a front view in elevation of a focusing electrode system which may be employed with the apparatus of the present invention;

FIGURE 3 is a schematic wiring diagram of the circuit of the present invention; and FIGURE 4 is an equivalent circuit diagram of the cable and one of the focusing electrode system circuits.

Referring now specifically to FIGURE 1 of the accompanying drawings, there is illustrated a bore hole 1 which traverses a plurality of subsurface strata 2, 3, 4, 5, 6 and 7, whose various dips are to be measured by the apparatus of the present invention. Suspended in the bore hole 1 is a well logging tool 9 having three bow spring arms 11 and 12 (the third arm not being illustrated) disposed at locations spaced from one another by 120° about the tool 9. The arm 11 carries on its outer surface a rubber pad 13 having two semi-annular focusing electrodes 14 and 16 (see FIGURE 2) disposed respectively above and below a circular center electrode 17. The electrodes 14, 16, and 17 constitute a focusing electrode system with the electrodes 14 and 16 being insulated from one another and also from the center electrode 17. The electrodes 14 and 16 need not be insulated from one another and may, in fact, be joined to form a single annular electrode completely surrounding center electrode 17. The rubber pad 13 carries a current collector electrode 18 on the rear surface thereof which is suitably insulated from the bow spring 11. Separate leads, all of which are designated by the reference numeral 19, are returned from each of the electrodes 14, 16, 17 and 18 to electrical circuits (illustrated in FIGURE 3) located within the tool 9. The circuits in tool 9 communicate with a surface station via conductors contained in an instrument cable 8.

The bow spring 12 is also provided with a pad 21 having a focusing electrode system disposed thereon which is identical with the electrode system secured to the bow spring 11. The two illustrated bow springs 11 and 12 and the further bow spring not illustrated carrying also a pad identical to 13 and 21 serve approximately to center the tool 9 in the bore hole 1 and to maintain the outer surfaces of the pads 13 in contact with the wall of the bore hole 1 during logging operations.

The conductors arranged in the communication cable 8 are connected to surface station receiving equipment designated by the single reference numeral 22 which may comprise signal amplifiers and suitable interpretative equipment if necessary. The output information from the apparatus 22 constitutes three signals which are functions of the resistances measured by the down hole equipment and are employed to produce three different records on a chart, graph or other suitable recording device 23 so as to obtain three distinct plots of resistivity. Recording normally takes place as the tool 9 is withdrawn from the bore hole 1 and the chart 23 is driven in synchronism with movement of the tool 9 so that the three resistivity curves are plotted against bore hole depth. Proper interpretation of these recordings provides the trained observer with an indication of changes in resistivity of the formations being investigated and therefore permits a ready determination of the depth of the boundaries of the various strata at three points about the bore hole 1 as determined by the electrode system locations. By suitable correlation of this information, the dip of each of the formations encountered may be determined and also the nature of the formations may be postulated from the resistivity information obtained. It is an elementary theorem of geometry that three points determine a plane. Each of the three spaced electrode systems measures the depth of a formation change, from which measurements the plane (i.e., dip) of the formations can easily be determined by well-known geometrical means and methods. It is obviously not necessary that the three systems be spaced evenly, although this is most convenient as well as most accurate.

The focusing electrode system illustrated in FIGURE 2 is intended to be exemplary only and various types of focusing electrode systems may be employed. The electrode array may comprise a large number of distinct focusing electrodes disposed concentrically and symmetrically about the center electrode of the system and it is not intended to limit the scope of the invention to a specific electrode system since various types of arrays are well known in the art and are all readily applicable to the present invention.

Referring now to FIGURE 3 of the accompanying drawings, there is illustrated a circuit diagram of the system of the present invention. The cable 8 comprises a pair of leads 24 and 25, one of which may be the grounded sheath of the cable, adapted to have constant amplitude alternating current, preferably at 400 cycles per second, applied thereto. The lead 24 extends down the cable 8 to the well tool 9 and is connected to one end of a primary winding 26 of a transformer 27 having a secondary winding 28. The other end of the primary winding 26 is connected via a lead 29 to one end of a primary winding 31 of a transformer 32 having a secondary winding 33. The other end of the primary winding 31 is connected via a lead 34 to one end of a primary winding 36 of a transformer 37 having a secondary winding 38. The other end of the primary winding 36 is connected to the lead 25, thus completing a series circuit including the leads 24 and 25 and the three primary windings 26, 31 and 36 of the transformers 27, 32 and 37, respectively. For purposes to become apparent subsequently, the transformation ratios of the transformers 27, 32 and 37 are equal.

The secondary winding 28 of the transformer 27 is connected in series between a collector electrode 18' of a focusing electrode system and focusing electrodes 14' and 16', the numeral portions of the prime numbers corresponding to the numerals applied to the corresponding apparatus as illustrated in FIGURE 2 of the accompanying drawings. A center electrode 17' is connected to one end of a low impedance input winding 39 of an output transformer 41 having a secondary winding 42. The other end of the winding 39 is connected to the end of the secondary winding 28 of the transformer 27 which is connected to the focusing electrodes 14' and 16'. The circuit of this focusing electrode system includes a fixed known value resistor 43 connected directly across the secondary winding 28 of the transformer 27.

Each of the other two focusing electrode systems is identical with the one just described and the center system, as viewed in FIGURE 3, comprises a fixed value resistor 44 connected across a secondary winding 33 of the transformer 32, a collector electrode 18", focusing electrodes 14" and 16" and a center electrode 17". The secondary winding 33 of the transformer 32 is connected in series between the focusing electrodes 14" and 16" on the one hand and the collector electrode 18". A low impedance input primary winding 46 of a transformer 47 having a secondary winding 48 is connected in series between the center electrode 17" and the end of the primary winding 33 of the transformer 32 connected to the focusing electrodes 14" and 16". Similarly, the bottom focusing electrode system, as viewed in FIGURE 3, comprises the focusing electrodes 14''' and 16''', a center electrode 17''' and a collector electrode 18'''. The secondary winding 38 of the transformer 37 is connected in series between focusing electrodes 14''' and 16''' on the one hand and the collector electrode 18'''. A low impedance primary winding 49 of a transformer 51, having a secondary winding 52, is connected in series between the center electrode 17''' and the end of the secondary winding 38 of transformer 37 connected to the focusing electrodes 14''' and 16'''. A fixed value resistor 53, equal in value to resistors 43 and 44, is connected across the secondary winding 38.

The secondary winding 42 of transformer 41 of the upper focusing electrode system, as viewed in FIGURE 3, is connected to a rectifier system 54 which produces a direct current through leads 56 and 57 which is proportional to the alternating current applied to the rectifier. The lead 56 is connected to a common lead 58 of the cable 8 and the lead 57 is connected to a lead 59 also of the cable 8 which is returned to the surface station and, more specifically, is connected as one input lead to the apparatus 22 as illustrated in FIGURE 1. The secondary winding 48 of the transformer 47 associated with the middle electrode system, as viewed in FIGURE 3, is connected to a rectifier 61 which develops a direct current proportional to the alternating current, applied thereto, through leads 62 and 63. The lead 62 is connected to the common lead 58 while the lead 63 is connected to a further lead 64 of a cable 8 which is also returned to the apparatus 22 at the surface station. The secondary winding 52 of the transformer 51 applies current to a rectifier system 66 which develops a direct current proportional to the alternating current applied thereto, through leads 67 and 68. The lead 67 is connected to the common lead 58 while the lead 68 is connected to another lead 69 of the cable 8 which is also returned to the apparatus 22 at the surface station as illustrated in FIGURE 1.

In operation of the system, 400 cycle per second current from a constant current source is applied through the leads 24 and 25 of the cable 8 and therefore, is applied in series through the primary windings 26, 31, and 36 of the transformers 27, 32 and 37, respectively. Since the transformation ratios of the transformers 27, 32 and 37 are equal, the current flowing through the primary windings 26, 31 and 36 develops an equal current in each of the secondary windings 28, 33 and 38. Also since the values of the resistors 43, 44 and 53 are equal and predetermined, the magnitudes of the voltages developed across the resistors 43 and 44 and 53 are equal and known to the observer. This latter statement, however, is true only so long as the measured resistances of the formations under investigation are sufficiently large with respect to the resistance of the resistors 43 and 44 and 53 so as not to disturb or influence substantially the voltage developed across these resistors. It can be seen that the resistance of the formations is, in effect, in parallel with the resistors 43, 44 and 53 and reference is now made to FIGURE 4 which is an equivalent circuit diagram of the cable 8 and one of the focusing electrode systems employed in the present invention. The resistance of the cable 8 and, more specifically, the leads 24 and 25, is represented by a resistor $R_1$ which is connected in series, across a constant current source S, with a resistor R representing the resistance of one of the fixed value resistors 43, 44 and 53 as reflected into the primary circuit of one of the line transformers. The resistance R is shunted by the focusing electrode system and the resistance of the formation is represented by a resistance $R_2$ appearing between the electrodes. If the resistors R and $R_2$ are of the same order of magnitude, a variation in the resistance of $R_2$ produces a relatively large variation in the division of current between these two resistors. However, if the resistance $R_2$ is considerably larger, at least an order of magnitude larger, than the resistance R, then the effect of a variation of resistance of the resistor $R_2$ on the division of current between the two resistors is relatively small. In a specific example of an apparatus which may be employed, the ratio of the impedance of resistor $R_2$ to the impedance of resistor R is fifty to one and under such circumstances, variations in resistance of the resistor $R_2$, of a magnitude which would be encountered in a well surveying operation, have no appreciable effect upon the current flowing to the resistor R. Therefore, the current flowing to the resistor R may be considered to have a constant value and the voltage across this resistance may also be considered to be constant. The distributed cable capacitance, which is negligible in this application, is illustrated as capacitance $C_1$.

Returning now to the circuit of FIGURE 3, it is seen that upon the application of a constant current between the leads 24 and 25, the same known fixed value of voltage is developed across the resistors 43, 44 and 53 and it is only necessary to measure the current flowing to the center electrodes 17', 17" and 17''' in order to determine the resistance of the formation between each of the center electrodes and its associated collector electrode. The currents flowing to the center electrodes produce currents in the secondary windings 42, 48 and 52 which are direct functions of the resistance of the formations. These currents are converted to direct current by the rectifiers 54, 61 and 66 for transmission to the surface via the leads 58, 59, 64 and 69 of the cable 8. The rectifiers 54, 61 and 66 may be eliminated but it is preferable to employ D.C. transmission to the surface so as to prevent cross-coupling between the various circuits.

It is seen from the above that all of the information necessary to a determination of the resistivity of the various formations encountered by the three focusing electrode systems of the present invention may be transmitted to the surface via only four information leads or conductors, this constituting a reduction of at least three leads over prior art focusing electrode systems. As previously indicated, such a reduction of almost fifty percent in the number of conductors required to convey information is extremely important since the number of conductors available in a well logging instrument cable are limited and the utilization of seven conductors for a single measurement places a severe limitation on the number and type of measuring circuits which may be incorporated in the tool 9 of FIGURE 1.

While I have described and illustrated one specific embodiment of my invention, it will be clear that variations of the details of construction which are specifically illustrated and described may be resorted to without departing from the true spirit and scope of the invention as defined in the appended claims. For example, resistivity measurements broadly include conductivity measurements for the purposes of this invention, since conductivity is merely the reciprocal of resistivity and may be measured with the same electrode systems.

What I claim is:

1. A well logging apparatus for determining the resistivity of subsurface formations intercepted by a bore hole, at least one electrode system located in said bore hole and including a center electrode, at least one focusing electrode and a collector electrode, a surface station including a source of constant current, a cable interconnecting said surface station and said electrode system, means for applying a constant current from said source to said cable, a resistor connected between said collector electrode and the other electrodes of said electrode system and electrically in parallel with the resistance of the formations to be investigated said resistor having an impedance substantially smaller than the said resistance of the formations to be investigated, means for applying the constant current on said cable through said resistor in parallel with said resistance of the formations, a transformer having a low impedance primary winding and a secondary winding, means connecting said primary winding between said center electrode only and said resistor and means for transmitting a signal proportional to the voltage developed across said secondary winding to said surface station.

2. A well logging apparatus for determining the resistivity of subsurface formations comprising a plurality of electrode systems each including a collector electrode and another electrode, a cable electrically interconnecting said electrode systems with a station remote therefrom, means for applying a constant current to said cable at said remote station, a plurality of substantially equal resistors each connected in series between said collector electrode and said another electrode respectively in a different one of said electrode systems, the ratio of the resistance of each of said resistors and the resistance of the formations under investigation being approximately one to fifty, a plurality of input means connected in series across said cable each for applying current from said constant current means through a different one of said resistors to develop a substantially constant voltage across each of said resistors, a plurality of transformers each having a low impedance primary winding and a secondary winding, means connecting each of said primary windings between said resistor and said another electrode respectively of a different one of said electrode systems, said cable including a common lead and a plurality of further leads, and coupling means connecting each of said secondary windings between said common lead and a different one of said further leads.

3. The combination according to claim 2 wherein said coupling means includes a plurality of rectifier systems each developing a direct voltage across a different pair of said leads proportional to the voltage developed across the secondary winding of its associated transformer.

4. The combination according to claim 2 wherein said input means each comprises a transformer having a primary winding connected in series with said primary windings of each of the other of said transformers of said input means and a secondary winding connected across a different one of said resistors.

5. A well logging apparatus for determining the dip of subsurface formations comprising three electrode systems each including a collector electrode, a central current electrode and a focusing electrode structure surrounding said central electrode, a cable electrically interconnecting said three electrode systems with a station remote therefrom, means for applying a constant current to said cable at said remote station, a plurality of substantially equal resistors each connected in series between a collector electrode on one hand and the central electrode and its associated focusing electrode structure on the other hand of a different one of said electrode systems respectively, the resistance of said resistors being small relative to the resistance of the formations under investigation, a first plurality of transformers each having a primary winding and a secondary winding with their primary winding connected in series to receive said constant current and with the secondary winding of each connected to apply current through a different one of said resistors to develop a substantially constant voltage across each of said resistors, a second plurality of transformers each having a low impedance primary winding and a secondary winding, means connecting each of said primary windings between said resistor and the central electrode of a different one of said electrode systems respectively, said cable including a common lead and a plurality of further leads, and coupling means connecting each of said secondary windings between said common lead and a different one of said further leads.

References Cited in the file of this patent

UNITED STATES PATENTS

| | | |
|---|---|---|
| 2,446,303 | Owen | Aug. 3, 1948 |
| 2,669,688 | Doll | Feb. 16, 1954 |
| 2,707,768 | Owen | May 3, 1955 |
| 2,743,152 | Carleton | Apr. 24, 1956 |
| 2,879,468 | Lamb | Mar. 24, 1959 |
| 2,886,774 | Probus | May 12, 1959 |
| 2,921,253 | Liben | Jan. 12, 1960 |